April 16, 1963 W. O. RUSSELL 3,085,500
COOKING APPARATUS
Filed Nov. 20, 1956 3 Sheets-Sheet 2
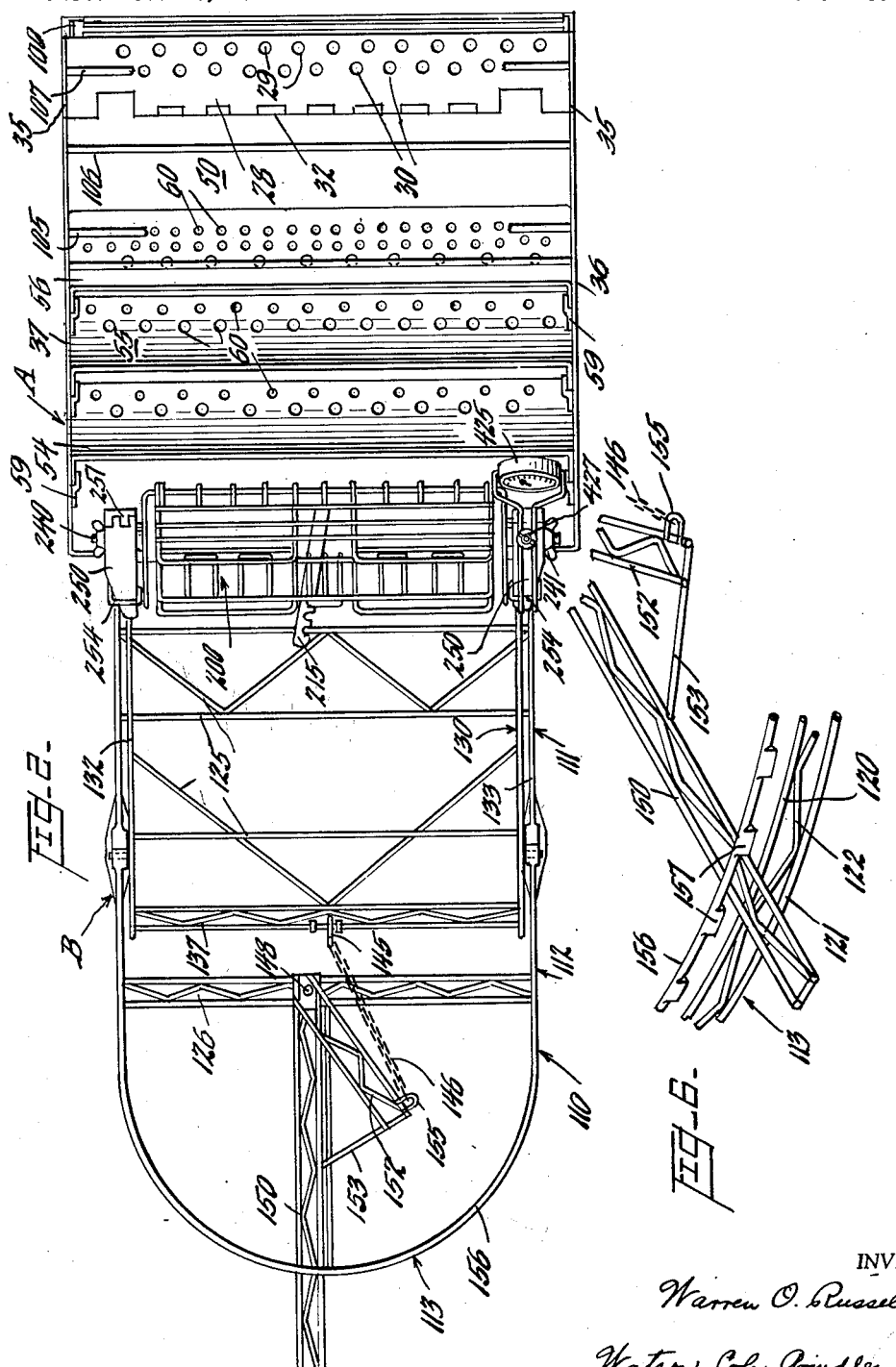
INVENTOR
Warren O. Russell
BY Watson, Cole, Grindle & Watson
ATTORNEYS

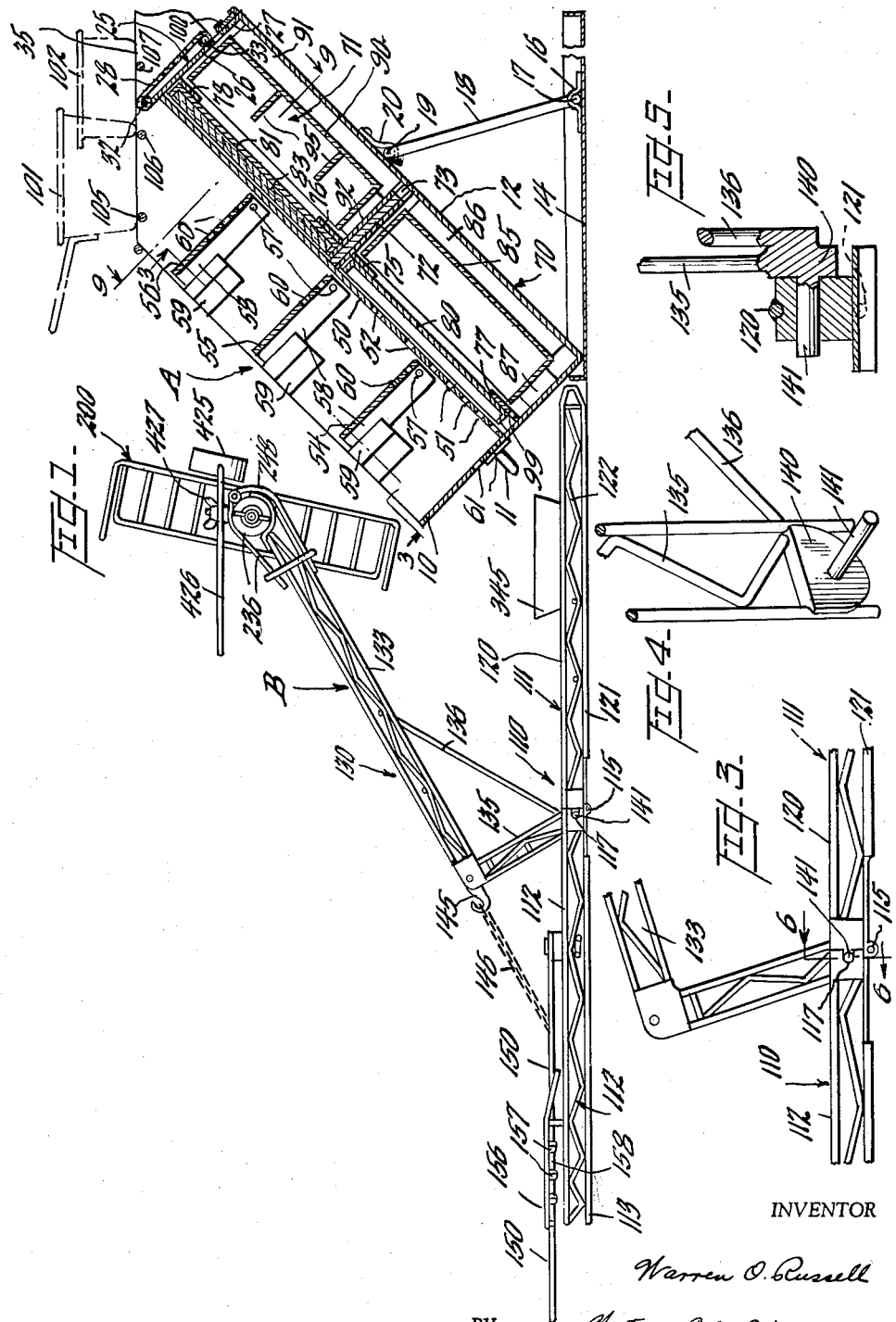

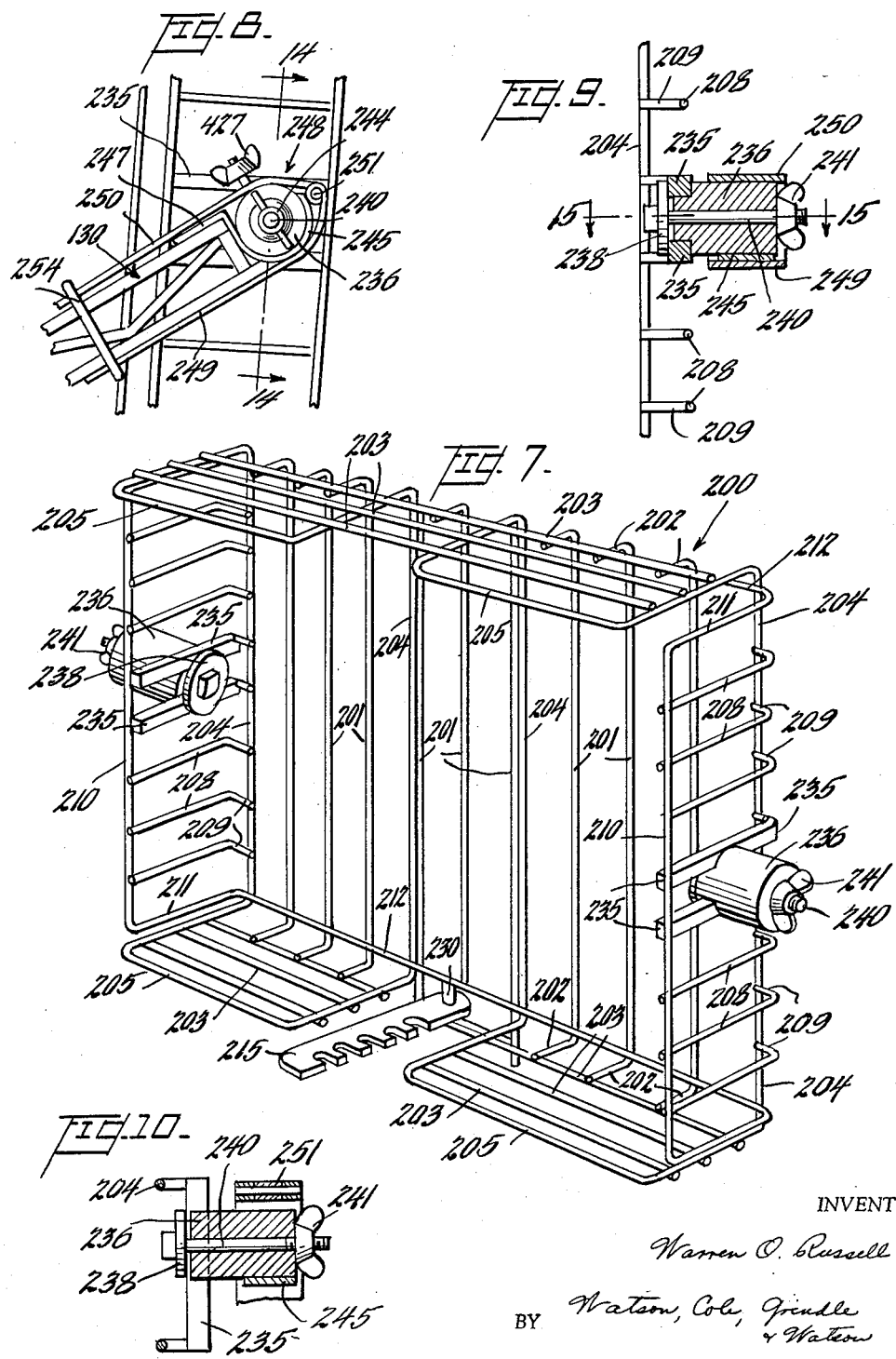

United States Patent Office 3,085,500
Patented Apr. 16, 1963

3,085,500
COOKING APPARATUS
Warren O. Russell, Rangeley, Maine
Filed Nov. 20, 1956, Ser. No. 623,427
7 Claims. (Cl. 99—427)

This invention relates to cooking devices and more particularly to devices of this class which may be made to be portable and conveniently arranged and constructed for use on camping trips, cook-outs, prospecting or exploring expeditions, and the like.

The general object of the invention is to provide a novel and improved device of this character which is easy to set up, take down or dismantle, and operate for the efficient cooking of food of many varieties, whether the process involves roasting, broiling, baking, boiling, stewing, frying, or other processes.

One important feature of the invention is the novel and ingenious provision for the control of the application of heat to the comestible being cooked, taking into account the natural tendency of the hot convection gases from the source of heat to rise, and also the utilization of the emission of heat from such source by radiation.

In its preferred embodiment, the invention contemplates the provision of a firebox which combines the features of providing the source of heat for all of the various cooking operations, together with ovens for roasting and baking, and a level stove surface for frying, boiling, and simmering. The apparatus further includes, in close association and combination with this firebox and stove unit, a novel adjustable supporting grid for holding meat products of widely diverse kinds in the proper regulatable proximity to the fire in the firebox unit, whether these meats are in the form of hamburgers, frankfurters, steaks, or of a thicker and more rounded configuration as beef roasts or chicken and other poultry.

One of the principal objects of the invention is the provision of novel and improved means for adjustably supporting the broiler grill at the optimum angle with respect to the source of heat, such means comprising a novel and ingenious stand or bracket of a portable nature adapted to be positioned flat on the ground, and having a boom structure for adjusting the grill to various angles and at various elevations.

Other objects and features of novelty will be apparent from the following specification when read in connection with the accompanying drawings in which certain embodiments of the invention are illustrated by way of example.

In the drawings:

FIGURE 1 is a view partly in side elevation and partly in vertical cross section, of an outdoor cooker embodying the principles of the invention; the device being set up to prepare a meal including dishes which are to be roasted, baked, stewed or otherwise prepared;

FIGURE 2 is a top plan view of the apparatus as set forth in FIGURE 1;

FIGURE 3 is a fragmentary view in side elevation of a portion of the adjustable broiler grid support shown in FIGURE 1;

FIGURE 4 is a further enlarged detail view of the same portion of the apparatus;

FIGURE 5 is a fragmentary sectional view taken on line 6—6 of FIGURE 3;

FIGURE 6 is a fragmentary view in perspective of a portion of the broiling grid support showing an adjustment feature for the operating handle;

FIGURE 7 is a view in perspective of one form of grid for supporting meat or other articles for broiling;

FIGURE 8 is a fragmentary view in side elevation showing an adjustable pivot connection between the broiler grid and one of its supporting arms;

FIGURE 9 is a fragmentary sectional view taken on line 14—14 of FIGURE 8;

FIGURE 10 is a transverse sectional view taken on line 15—15 of FIGURE 9.

One of the preferred forms of the invention is illustrated in general assembly and in position for use, in FIGURES 1 and 2 of the drawings. In these figures and certain of the detail views developing this embodiment, the firebox and oven section is indicated generally by the reference character A while the cooperating adjustable broiler section of the device together with its supporting crane or derrick has the general designation B.

Now taking into consideration FIGURES 1 and 2, the detailed construction of the section A of the apparatus will be understood. This section is of a general rectangular box-like shape, and for purposes of clearer explanation, the various parts will be referred to as they assume their positions while the unit A is in diagonal tilted position as clearly shown in FIGURE 1. Thus, the surface 10 of this firebox and oven section, while it constitutes the top side of the unit when folded for travel, is actually what may be called the bottom surface of the unit when set up for use as in FIGURE 1. The handle 11 by which the entire apparatus may be transported when packed for travel occupies an out-of-the-way position when the device is in use. The broad side surface 12 of the section becomes the rear surface in use and the cover member 14, removed from the opposite side of the device, is employed as a base plate deposited upon the ground as in FIGURE 1 with its front flange 15 abutting the corner portion of the unit A between the surfaces 10 and 12. The cover or pan 14 contains brackets 16 into which the upwardly extending prongs 17 of the U-shaped brace 18 are pivotally secured. The bight 19 of the U-brace 18 is adapted to be snapped beneath the spring clamping brackets 20, and the tray and brace combination 14, 18 is so proportioned as to serve effectively as a bracing support for the unit A maintaining it at the optimum angle of approximately forty-five degrees, although certain variations from this angularity may be tolerated under some conditions and for certain purposes.

It will be noted that the hinged portion 28 of the side 25 carries a triangular section 35 of each of the side walls of the unit A, which side walls have been given the respective designations 36 and 37. The portions 35 are cut away from the walls 36 and 37 on a forty-five degree angle so that when the pivoted section 28 is swung to open position as shown in FIGURE 1 the lines of severance are in horizontal alignment. This arrangement serves a purpose which will be described in connection with the operation of the apparatus.

The forward portion of the combined firebox and oven section A will now be described. A partition 50 separates the forward firepot compartment from the rearward oven compartment, as clearly shown in FIGURE 1 of the drawings, and it will be seen that substantially the lower half of the partition is provided with rows of apertures 51 and 52. The firepot portion of the unit is divided into four compartments in the embodiment illustrated herein, these compartments being separated one from the other by the pivoted flanged partitions 54, 55 and 56, these partitions being pivoted upon the pintles 57 and the flanges 58 adapted to be moved behind the brackets 59 to be held in operative position. Each of the partitions 54, 55 and 56 is provided with perforations 60 and the end wall 10 is provided with the rows of perforations 61, all of which provide draft openings for the fires maintained by the burning fuel in one or more of the several compartments, depending upon the amount of heat required and the extent of the cooking operation. Of course, the entire forward face of the unit A is open, due to the removal of the cover plate 14 which now acts as a supporting tray for the unit.

The lower compartment designated generally by the numeral 70 is separated from the upper compartment 71 by means of the partition 72 which may comprise a pair of spaced metal panels between which is inserted a plate of insulating material. This partition 72 is provided with a series of openings 73 at the rear edge thereof through which hot gases may pass as later described.

Extending in opposite directions from both sides of the partition 72 are the supporting flanges 75 and 76, and similar inwardly directed flanges 77 and 78 are secured to the inner surfaces of the walls 10 and 25. Forwardly of these flanges are slidably disposed the removable flanged panels 80 and 81. Panel 80 is shown merely as a metal tray while panel 81 is combined with a sheet or block of insulating material 83. These respective panels 80 and 81 comprise the forward walls of the compartments 70 and 71.

A roasting or baking box or tray 85 having end supporting flanges 86 and a spacing element 87 formed thereon is slidably mounted within the compartment 70 and capable of removal through an opening in the oven.

A similar baking box or tray 90 is slidably mounted in the compartment 71 and is similarly provided with flange-like legs 91, a spacing member 92, and is also furnished with partitions 95 which are useful in separating small articles to be baked such as biscuits.

It will be noted that the openings 51 and 52 through which hot gases may pass from the two lower fireboxes communicates with one side of the partition plate 80 and around the lower edge of this plate. These gases may pass through openings 99 in the supporting flange 77 and thence around the lower edge of the roasting or baking box 85 up the space beneath and to the rear of this box through the space which is afforded by the flange-like legs 86, thence through the openings 73 in the partition 72 and upwardly to the rear of the baking box 90, and finally out through the openings 27 which may be controlled by a damper 100 to regulate the amount of heat permitted to pass beneath and around the respective roasting and baking compartments. The roasting box 85 is best adapted for the utilization of more heat than the baking box 90 and may well be used for roasting potatoes and the like. The baking box 90 on the other hand, is more remote from the source of the hot gases and is insulated from the upper two fuel compartments by means of the panel 81, 83 and is best adapted for baking of articles which require moderate heat.

In FIGURE 1 of the drawings, there is shown how the swinging of the wall section 28 about its hinge 32 provides a level surface for the placement of pots and pans, such as indicated at 101 and 102, for the boiling, frying, or stewing of comestibles, and it will be readily understood how the cross rods 105, 106 and 107 aid in forming a sort of grid to support these utensils. Obviously, a hot fire in the uppermost firebox compartment will afford good heat for boiling, frying, or stewing of vegetables or the like to the left of this level upper work surface, and foodstuffs which are to be simmered or merely kept warm may be moved to the right-hand side of this supporting surface further away from the fire.

The broiler portion of the device together with its supporting derrick or crane (designated in its entirety by the letter B) will now be described in detail and its novel, efficient, and necessary cooperation with the section A explained. The base frame of this section of the apparatus is designated generally by the reference numeral 110 and comprises a generally rectangular member 111 which is pivoted to a similarly flat member 112, the latter member having a semi-circular end portion 113. The pivotal or hinge connection between the members 111 and 112 comprises a rule joint the pintle of which is indicated at 115. One of the faces of the abutting ends of the two members (in this case the member 112) is provided with a notch 117 which is adapted to receive a stub pintle for supporting an adjustable portion of the broiler rack which will be described presently.

Although any preferably skeleton construction can be adopted for the support 110, a very useful one is illustrated in the drawings where the framework consists essentially of an upper rod 120, a lower rod 121, and a zigzag intermediate rod 122 which may have its nodal points welded alternately to the upper and lower rods 120 and 121. This construction affords a very lightweight and easily portable framework.

Any suitable cross bracing such as indicated at 125 may be provided for the substantially rectangular frame 111 and a skeleton cross piece 126 may suffice for bracing the frame section 112 and also for providing pivotal support for an operating lever as will be described.

A vertically pivotable crane arm or beam member 130 comprises the side frames 132 and 133, each of which has a downwardly depending rectilinear leg member 135, these parts being braced by means of the struts 136 and a cross frame 137 connecting the two side frames 132 and 133 near the knees between the side frames and the legs 135.

At the base of each of the legs 135 there is provided a block 140 from which extends a stub shaft or pintle 141 which is outwardly directed to be received within one of the notches 117 involved in the rule joint which is pivoted at 115. It will thus be seen that when the pivoted sections 111 and 112 are brought into alignment and the rule joint into abutment, the pintles 141 will be securely held in rotative position whereby the crane member 130 may pivot in a vertical plane.

Intermediate the length of the cross frame 137 of the crane member 130, there is provided a hook 145 or other attachment element to which one end of the chain 146 is attached. Pivoted upon the cross brace 126 of the rear base element 112 as at 148 is the operating arm 150 which may be of the same type of skeletonized construction as the members and the base frames. The pivot 148, it will be noted from an inspection of FIGURE 2, is somewhat off-center as respects the mid-point of the cross brace 126. The arm 150 is provided with the angular bracket frame 152 which may be braced as by means of the bar 153. Near the end of this angular frame 152, a securing means 155 is provided for the other end of the chain 146.

The operating or adjusting lever 150 extends rearwardly above the semi-circular curved portion 113 of the base frame section 112 and is received beneath the similarly semi-circularly curved bar 156. As shown best in FIGURES 1 and 6 of the drawings, this bar 156 is provided with spaced abutments 157 between which occur the relieved portions or notches 158 within which the handle frame 150 may be retained in a number of adjusted positions.

It will be seen from the description thus far that angular adjustment of the handle 150 in a horizontal plane will cause the chain 146 to be tensioned or relaxed depending upon the direction of movement and thus either pull rearwardly upon or ease off on the connection 145 and thus raise or lower the broiler crane 130 about its pintles 141 and thus regulate the position of the right-hand or operative end of the crane 130 which carries the broiler 200, relatively to the firebox section A of the apparatus.

Certain embodiments of the broiler itself will now be described particularly in connection with FIGURES 1 and 7 to 10 of the drawings. The grid-like meat holder or broiler proper to which the reference numeral 200 has been applied comprises a skeleton framework which in its preferred form includes the parallel rods or bars 201 having in-turned ends 202 which are welded to one of a series of bars 203 which go to make up the side frame portions of the broiler. Certain of the rods 204, forming the base panel along with those designated 201, are bent inwardly and then parallel with the base to form generally U-shaped side frames indicated at 205. It will be seen that there are four of these U-frames, two upon each side of the device.

The end panels of the broiler grid comprise the relatively short rods 208 having ends bent inwardly at 209 and welded to one of the end rods 204 of the bottom panel. The other ends of the short rods 208 are welded to the transverse portion 210 of a marginal rod which extends for a distance parallel with the rods 208 as indicated at 211 and thence along the edges of the entire base panel as at 212.

A cover grid, which may be of any suitable form, must of course be applied to the broiler in order to retain the contents during cooking. Such a cover grid will have side portions inserted within the loops at 205 in FIGURE 7 and the opposite side will be retained in an adjustable manner by means of the swinging hasp or clamping lever 215.

The means for pivotally supporting or trunnioning the broiler upon the upwardly extending end of the crane 130 will now be described. Bars 235 of preferably rectangular cross-section are welded or otherwise secured centrally of the end frames which are constituted by the bars 208 and disposed in parallel relation with said short bars. These bars or blocks 235 provide a track for the cylindrical hubs 236 as best shown in FIGURES 12 and 14. Near the inner end of the cylindrical hub 236 it is rabbeted off to form parallel grooves upon each side which fit against the bars 235. Clamped against the opposite side of these bars is the flat circular plate 238 through which the bolt 240 passes and the whole assembly including the plate 238 and the hub 236 may be clamped into selected position along the guide bars 235 by means of the wing nut 241.

Referring now to FIGURES 1, 8, 9 and 10 of the drawings, it will be perceived that the end portions of the side frames of the crane 130 are provided with hook-shaped metal straps 245, the flat shank portions 247 of which may be welded, riveted, or bolted to these side frames with the loop portions projecting forwardly to receive the hub elements 236. In order to clamp the hubs in selected rotative positions, a pivoted clamping device is provided which may be fixed to the end of the crane arms or employed as a separate element of the assembly. This clamp designated 248 may be made of an ordinary hinge having two hasps, one of which 249 is applied to the lower surface of the end of one of the side frames of the crane 130, and the other hasp 250 pivoted to the pintle 251 may be swung about the pivot to clampingly engage the hub 236, this hasp 250 being retained in hub clamping position by means of the lock shackle 254 which, in the event the hasp 249 is not otherwise secured to the crane 130, may also serve to clamp both hasps in binding position about the hubs.

From the above description it will be understood how the broiler may be adjusted with respect to its hubs so as to bring the pivot centers represented by the pin 240 as near as possible to the center of gravity of the broiler including the meat or other article of food contained therein. This is of course accomplished by loosening the wing nut 241 adjusting the hubs to the desired position along the guides 235, and then tightening the wing nuts. In order to position the broiler at the optimum angularity with respect to the firepot unit A, the clamps 248 are released by the removal of the shackles 254 and the broiler with its hubs 236 rotated to the proper position and the clamps 248 re-applied.

Some of the novel features of the invention, including the preferred inclination of the source of heat and of the broiler, may be embodied in cookers in which the heat source is electrical or fluid, and whether or not the device is used outdoors or in a stove, fireplace, or other enclosure inside of a building.

It is understood that various changes and modifications may be made in the embodiments illustrated and described herein without departing from the scope of the invention as determined by the subjoined claims.

Having thus described the invention, what is claimed as new and desired to be secured by Letters Patent is:

1. A cooking apparatus especially adapted for outdoor use, which apparatus comprises a broiler grid for containing meat or other comestible to be positioned in an optimum position with respect to a fire for proper broiling, coaxial trunnion elements on said broiler grid, a planar base frame adapted to be laid flat upon the ground surface, a boom frame pivoted at its lower end to said base frame substantially within the plane of said base frame, means for adjusting said boom frame in a vertical direction at various angles to the horizontal, said adjusting means comprising a hand lever fulcrummed on said base frame, and means operatively connecting said hand lever to said boom frame, means for securing said hand lever in various selected positions of adjustment for holding said boom frame in adjusted angular positions, and coaxial sockets on the upper end of said boom frame receiving the trunnions of said grid, whereby said grid may be swung to selected angles with respect to the fire, and means at the ends of said boom frame firmly clamping the trunnions within said sockets in selective positions of rotative adjustment.

2. A cooking apparatus especially adapted for outdoor use, which apparatus comprises a broiler grid for containing meat or other comestible to be positioned in an optimum position with respect to a fire for proper broiling, trunnion elements on said broiler grid, a flat substantially horizontally disposed base frame, a boom frame pivotally connected at its lower end to said base frame, means for adjusting said boom frame in a vertical direction at various angles to the horizontal, means for securing said adjusting means for holding said boom frame in adjusted positions, and sockets on the upper end of said boom frame receiving the trunnions of said grid, whereby said grid may be swung to selected angles with respect to the fire, said boom frame comprising a pair of spaced parallel boom elements, the upper ends of which respectively carry the trunnion supporting sockets, each of said boom elements provided with an angled lower leg portion forming a knee portion at its junction with the main portion of the boom element, a horizontally adjusted swinging lever carried by said base frame, and a flexible strand connection extending between a portion of said lever and the knee portion of said boom where the boom elements join the said angled leg portions, whereby swinging said lever in a horizontal plane serves to raise and lower said boom in a vertical plane.

3. A cooking apparatus especially adapted for outdoor use, which apparatus comprises a broiler grid for containing meat or other comestible to be positioned in an optimum position with respect to a fire for proper broiling, trunnion elements on said broiler grid, a flat substantially horizontally disposed base frame, a boom frame pivotally connected at its lower end to said base frame, means for adjusting said boom frame in a vertical plane at various angles to the horizontal, means for securing said adjusting means for holding said boom frame in adjusted positions, and sockets on the upper end of said boom frame receiving the trunnions of said grid, whereby said grid may be swung to selected angles with respect to the fire, said boom frame comprising a pair of spaced parallel boom elements, the upper ends of which respectively carry the trunnion supporting sockets, said base frame comprising two horizontal sections pivotally connected for collapsing for storage, the pivotal connection being in the form of a rule joint, and a notch in at least one of the abutting surfaces of the sections of said rule joint, trunnion elements extending horizontally from the lower ends of said boom elements received within said notches to form said pivotal connection.

4. The apparatus as set forth in claim 2 in which said base frame comprises two hoizontal sections pivotally connected for collapsing for stowage, the sections each comprising side frames connected to the corresponding side frames of the other member by rule joints, a notch in at least one of the abutting surfaces of each of the side frames at said rule joints, a trunnion element extending horizontally from the lower end of each of said boom elements, the trunnions received in the respective notches at the rule joints between the side frame sections to form said pivotal connection.

5. The apparatus as set forth in claim 2 in which one end portion of said base frame is substantially semi-circular in peripheral configuration, and provided with a horizontal arcuate slot along the periphery to receive said lever, and stop means at intervals along said slot for retaining said levers in any of the several adjusted positions.

6. The apparatus as set forth in claim 5 in which said lever is pivoted to said frame at a point to one side of its center line, the lever has an angular extension, and one end of the flexible connection is secured to the end of said angular extension.

7. The apparatus as set forth in claim 2 in which said lever is pivoted to said frame at a point to one side of its center line, the lever has an angular extension, and one end of the flexible connection is secured to the end of said angular extension.

References Cited in the file of this patent
UNITED STATES PATENTS

| | | |
|---|---|---|
| 261,870 | Perkins | Aug. 1, 1882 |
| 842,695 | Peters | Jan. 29, 1907 |
| 1,085,671 | Day | Feb. 3, 1914 |
| 1,102,540 | Onions | July 7, 1914 |
| 2,144,918 | Garvis | Jan. 24, 1939 |
| 2,196,175 | Bornkessel | Apr. 9, 1940 |
| 2,198,134 | Spiegl | Apr. 23, 1940 |
| 2,297,825 | Bobo | Oct. 6, 1942 |
| 2,424,665 | Pope | July 29, 1947 |
| 2,520,578 | Treloar | Aug. 29, 1950 |
| 2,552,861 | Overman | May 15, 1951 |
| 2,576,028 | Mitchell | Nov. 20, 1951 |
| 2,600,234 | Foley | June 10, 1952 |
| 2,619,026 | Scott | Nov. 25, 1952 |
| 2,774,345 | Peplin | Dec. 18, 1956 |
| 2,839,989 | Persinger | June 24, 1958 |
| 2,851,941 | Cogar | Sept. 16, 1958 |

FOREIGN PATENTS

| | | |
|---|---|---|
| 3,969 of 1896 | Great Britain | Mar. 28, 1896 |